Patented Dec. 15, 1936

2,064,110

UNITED STATES PATENT OFFICE 2,064,110

TREATMENT OF MILK AND MILK PREPARATIONS

Ralph E. Hall, Mount Lebanon, Pa., assignor to Hall Laboratories, Inc., Pittsburgh, Pa., a corporation of Pennsylvania No Drawing. Application October 16, 1934, Serial No. 748,478

11 Claims. (Cl. 99—54)

The present invention relates to the treatment of milk and milk preparations, and more particularly to the treatment of milk and milk preparations to improve their digestibility. This application is a continuation-in-part of my copending application Serial No. 697,532, filed November 10, 1933.

The formation and constitution of the milk curds in the stomach is apparently intimately related to the digestibility of the milk. For example, cow's milk tends to form larger curds than human milk, which may account for the more difficult digestibility of cow's milk by human infants.

I have found that the digestibility of milk and milk preparations may be improved by the addition thereto of an alkali-metal metaphosphate, preferably sodium metaphosphate. The form which I prefer to use is the sodium hexametaphosphate or Graham's salt. The effect of the sodium metaphosphate is to reduce the concentration of calcium ion in the milk, which is responsible for curd formation. This is shown by the fact that if the calcium ion is reduced below a certain point the milk will not coagulate. Therefore, by controlling the amount of sodium metaphosphate added to the milk, the degree of curdling can be controlled or even entirely eliminated, thus improving the digestibility of the milk.

The action of the sodium metaphosphate is not to remove the calcium from the milk, but is rather to convert it into a slightly ionized water soluble sodium-calcium metaphosphate complex. This sodium-calcium metaphosphate complex is gradually hydrolyzed after absorption in the body, thus releasing the calcium and orthophosphate. The coagulation of the milk is thus controlled without robbing the milk of the calcium.

The present invention is applicable not only to the treatment of raw or pasteurized milk, but also the treatment of concentrated milk, such as evaporated milk or powdered milk, or other milk preparations, the digestibility of which may be improved by the action of the metaphosphate. All of these tend in the stomach to form curds, which curd formation can be controlled or even eliminated by the reduction of the ionic calcium in the milk. In the preparation of concentrated milk in accordance with the present invention, the milk is first concentrated and thereafter the metaphosphate is added to the concentrated milk which may be in either liquid or powdered form. By first concentrating the milk and thereafter adding the metaphosphate, the metaphosphate is maintained as such until the milk is consumed. If the metaphosphate were added to the milk and the milk then concentrated by the application of heat, the metaphosphate would revert to the orthophosphate which does not have the property of forming with calcium the soluble sodium-calcium metaphosphate complex. The sodium orthophosphate would react with the calcium in the milk to form insoluble calcium orthophosphate which cannot be assimilated by the body.

In case it is desired to increase the calcium content of the milk or milk preparation, the soluble calcium alkali-metal metaphosphate may be added, such as may be produced by adding calcium salt to a sodium metaphosphate solution or else by adding directly to the milk the desired amount of calcium salt and an amount of sodium metaphosphate calculated to take care of the additional calcium.

The invention is applicable to the treatment o milk preparations, such as infant food containing milk or to the treatment of milk containing food for use by those having delicate digestive systems. The metaphosphate is added to such foods after they have been prepared so as to avoid any subsequent heating of the milk used therein to a temperature such as would cause the metaphosphate to revert to the orthophosphate.

While I prefer to use the sodium hexametaphosphate, other water soluble metaphosphate may be used, such, for example, as the dimetaphosphate or the tetrametaphosphate. Also, th metaphosphates of other alkali metals may b used, such as those of potassium, ammonium lithium, etc.

I claim:

1. The process of improving the digestibility of milk and milk preparations and increasing the soluble calcium content, which comprises adding thereto a calcium salt and an alkali-metal metaphosphate which when the milk or milk preparation is in the liquid state holds the calcium i soluble slightly ionized form.

2. The process of improving the digestibility of milk and milk preparations and increasing the soluble calcium content, which comprises concentrating the milk, and thereafter adding there to a calcium salt and an alkali-metal metaphosphate which when the milk or milk preparation is in the liquid state holds the calcium in solub slightly ionized form.

3. The process of improving the digestibility milk and milk preparations, which compris adding thereto an alkali-metal metaphospha which when the milk or milk preparation is in the liquid state converts calcium into a slightly ionized water soluble calcium-alkali-metal metaphosphate complex, and maintaining the metaphosphate as such until the milk or milk preparation is consumed.

4. The process of improving the digestibility of milk and milk preparations, which comprises adding thereto sodium hexametaphosphate, and maintaining the hexametaphosphate as such until the milk or milk preparation is consumed.

5. The process of improving the digestibility of milk and milk preparations and increasing their soluble calcium content, which comprises adding thereto a calcium salt and sodium hexametaphosphate.

6. The process of improving the digestibility of milk or milk preparations, which comprises concentrating the milk, and thereafter adding thereto an alkali-metal metaphosphate which when the milk or milk preparation is in the liquid state holds the calcium in the milk in soluble slightly ionized form.

7. A milk preparation in finished form containing an alkali-metal metaphosphate having the property of reducing the concentration of the calcium ion in the milk while retaining the calcium in water soluble form when the preparation is in the liquid state.

8. A milk preparation in finished form containing in addition to the calcium originally 9. A preparation containing concentrated milk and an alkali-metal metaphosphate having the property of reducing the concentration of calcium ion in the milk while retaining the calcium in water soluble form when the preparation is in the liquid state.

10. A preparation containing concentrated milk and an alkali-metal hexametaphosphate.

11. An easily digestible milk preparation containing in addition to the calcium originally present in the milk a calcium salt and an alkali-metal metaphosphate having the property when the milk prepration is in the liquid state of forming with the calcium salt a slightly ionized water soluble metaphosphate complex.

RALPH E. HALL.

CERTIFICATE OF CORRECTION.

Patent No. 2,064,110.  December 15, 1936

RALPH E. HALL.

It is hereby certified that error appears in the printed specification of the above numbered patent requiring correction as follows: Page 2, second column, line 7, claim 8, strike out "in addition to the calcium originally" and insert instead the words and period sodium hexametaphosphate.; and that the said Letters Patent should be read with this correction therein that the same may conform to the record of the case in the Patent Office.

Signed and sealed this 23rd day of February. A. D. 1937.

(Seal)

Henry Van Arsdale
Acting Commissioner of Patents.